(12) United States Patent
    Choi et al.

(10) Patent No.: US 9,084,022 B2
(45) Date of Patent: Jul. 14, 2015

(54) IMAGE DISPLAY APPARATUS AND METHOD FOR DISPLAYING TEXT IN THE SAME

(75) Inventors: Woosik Choi, Seoul (KR); Dami Choe, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 361 days.

(21) Appl. No.: 13/167,163

(22) Filed: Jun. 23, 2011

(65) Prior Publication Data
    US 2012/0254716 A1    Oct. 4, 2012

(30) Foreign Application Priority Data
    Apr. 4, 2011    (KR) ........................ 10-2011-0030614

(51) Int. Cl.
    *G06F 17/00*    (2006.01)
    *H04N 21/4788*  (2011.01)
    *H04N 21/475*   (2011.01)
    *H04N 21/84*    (2011.01)
    *G06F 3/01*     (2006.01)

(52) U.S. Cl.
    CPC ......... *H04N 21/4788* (2013.01); *H04N 21/475* (2013.01); *H04N 21/84* (2013.01); *H04N 21/4756* (2013.01)

(58) Field of Classification Search
    CPC ............ G06F 17/241; G06F 15/17306; G02F 2001/13775
    USPC ............................ 715/230; 386/230; 455/457
    See application file for complete search history.

(56) References Cited

U.S. PATENT DOCUMENTS

| | | | | |
|---|---|---|---|---|
| 6,031,526 A | * | 2/2000 | Shipp | 715/201 |
| 6,088,039 A | * | 7/2000 | Broder et al. | 345/596 |
| 6,452,615 B1 | * | 9/2002 | Chiu et al. | 715/776 |
| 8,413,054 B2 | * | 4/2013 | Kaplan et al. | 715/719 |
| 8,438,484 B2 | * | 5/2013 | Gunatilake | 715/720 |
| 8,776,124 B2 | * | 7/2014 | Jin et al. | 725/41 |
| 2002/0105535 A1 | * | 8/2002 | Wallace et al. | 345/719 |
| 2006/0274157 A1 | * | 12/2006 | Levien et al. | 348/220.1 |
| 2007/0174886 A1 | * | 7/2007 | Scheuer et al. | 725/110 |
| 2007/0261071 A1 | * | 11/2007 | Lunt et al. | 725/13 |
| 2007/0266304 A1 | * | 11/2007 | Fletcher et al. | 715/500.1 |
| 2007/0274563 A1 | * | 11/2007 | Jung et al. | 382/103 |
| 2008/0046925 A1 | * | 2/2008 | Lee et al. | 725/37 |
| 2008/0313570 A1 | * | 12/2008 | Shamma et al. | 715/846 |

(Continued)

OTHER PUBLICATIONS

Wireless LAN Aug. 29, 2010, pp. 1-7 http://en.wikipedia.org/wiki/Wireless_LAN.*

(Continued)

*Primary Examiner* — Kyle Stork
*Assistant Examiner* — Mario M Velez-Lopez
(74) *Attorney, Agent, or Firm* — Birch, Stewart, Kolasch & Birch, LLP

(57) ABSTRACT

A method of controlling an image display apparatus, and which includes receiving, via an interface unit of the image display apparatus, an input signal indicating at least one mobile terminal is connected to the image display apparatus; receiving, via the interface unit of the image display apparatus, text information input on the mobile terminal during reproduction of a video displayed on the image display apparatus; displaying the text information on a display unit of the image display apparatus; and displaying, on the display unit, a timeline indicating a time length of the displayed video and indication information indicating when the text information was input on the displayed timeline.

26 Claims, 12 Drawing Sheets

(56) References Cited

U.S. PATENT DOCUMENTS

| | | | |
|---|---|---|---|
| 2009/0066704 A1* | 3/2009 | Daniel et al. | 345/501 |
| 2009/0092374 A1* | 4/2009 | Kulas | 386/95 |
| 2009/0249223 A1* | 10/2009 | Barsook et al. | 715/753 |
| 2009/0297118 A1* | 12/2009 | Fink et al. | 386/52 |
| 2010/0009633 A1* | 1/2010 | Goldman et al. | 455/41.3 |
| 2010/0082784 A1* | 4/2010 | Rosenblatt et al. | 709/222 |
| 2010/0088634 A1* | 4/2010 | Tsuruta et al. | 715/800 |
| 2010/0235379 A1* | 9/2010 | Reichbach | 707/769 |
| 2010/0284667 A1* | 11/2010 | Yahata et al. | 386/241 |
| 2011/0074667 A1* | 3/2011 | Robinson | 345/156 |
| 2011/0111854 A1* | 5/2011 | Roberts et al. | 463/39 |
| 2011/0126127 A1* | 5/2011 | Mariotti et al. | 715/753 |
| 2012/0036423 A1* | 2/2012 | Haynes et al. | 715/230 |
| 2012/0254716 A1* | 10/2012 | Choi et al. | 715/230 |
| 2012/0262494 A1* | 10/2012 | Choi et al. | 345/672 |
| 2012/0282951 A1* | 11/2012 | Nguyen et al. | 455/457 |

OTHER PUBLICATIONS

Fadeyev Feb. 9, 2011, pp. 1-2 http://www.usabilitypost.com//2011//02//08//please-stop-disabling-subpixel-rendering//.*

Video Snapshots Genius, Aug. 2009, pp. 1-5 http://www.lonking.com/video-snapshots/.*

"A better Android Gallery on the Nexus One" Jan. 31, 2010, pp. 1-4 http://googlephotos.blogspot.com/2010/01/better-android-gallery-on-nexus-one.html.*

VideoANT, Oct. 2009, pp. 1-2 http://blog.lib.umn.edu/bhosack/videoant/2009/10/.*

VideoANT, Oct. 2009, pp. 1-3 http://blog.lib.umn.edu/bhosack/videoant/2009/10/.*

15 Useful jQuery Slideshow and Photo Gallery, Feb. 19, 2011, pp. 1-9 http://www.tutorialchip.com/jquery/15-useful-jquery-slideshow-and-photo-gallery/.*

* cited by examiner

IMAGE DISPLAY APPARATUS AND METHOD FOR DISPLAYING TEXT IN THE SAME

This application claims the benefit of Korean Patent Application No. 10-2011-0030614, filed on Apr. 4, 2011, which is hereby incorporated by reference as if fully set forth herein.

BACKGROUND OF THE INVENTION

1. Field of the Invention

The present invention relates to an image display apparatus and a method for displaying text in the image display apparatus, and more particularly, to an image display apparatus for enabling a user to post, on the image display apparatus, a comment related to an image being reproduced in the image display apparatus, and a method for displaying text in the image display apparatus.

2. Discussion of the Related Art

An image display apparatus displays image information on a screen. An example image display apparatus is a TV system that receives a broadcast signal from a broadcast station and displays images based on the broadcast signal. Along with the recent development of technology, the Internet can be accessed through an image display apparatus such as a TV.

Owing to the increasing popularity of the Internet, Internet users acquire information from cyberspace, namely the Internet and even build relationships in the cyberspace, for example, through Social Networking Service (SNS).

SNS is a service that focuses on strengthening of already-established social relations or developing new social relations among people, thus constructing a wide human network. The growing desire of individuals for expressing themselves becomes a driving force behind the development of SNS that assists in building and maintaining social relations among people. Individuals articulate their interests and share them with others through SNS. Especially, expressing opinions, offering information, or sharing information in relation to a variety of content provided in an image display apparatus is an activity example of SNS.

SUMMARY OF THE INVENTION

Accordingly, the present invention is directed to an image display apparatus and a method for displaying text in the same that substantially obviate one or more problems due to limitations and disadvantages of the related art.

An object of the present invention is to provide an image display apparatus for facilitating a user to enter a comment related to a video displayed on the image display apparatus and display the comment, and a method for displaying text in the image display apparatus.

Another object of the present invention is to provide an image display apparatus for facilitating a user to share a comment entered by the user with another user and a method for displaying text in the image display apparatus.

A further object of the present invention is to provide an image display apparatus for facilitating a user to capture a scene related to a comment and a method for displaying text in the image display apparatus.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for displaying text includes displaying a video on a screen of an image display apparatus, receiving information about text from an input device during reproduction of the video, displaying the text on the screen, and indicating inclusion of the text in the screen on a timeline of the video, displayed on the screen.

Information about text may be received from a plurality of input devices, and the text received from the plurality of input devices may be displayed on the screen.

The plurality of input devices may be connected to the image display apparatus, for communication.

The information about the text may be received from the plurality of input devices through one input device connected to the image display apparatus, for communication.

The information about the text may be received in the form of one of a text stream, a graphical image, and pixel information.

A text area separate from a video display area may be allocated to the screen, and the text may be displayed in the text area.

The text may be displayed together with a still image captured from the video at a text reception time in the text area.

The text display method may further include receiving a command for designating a text display position on the screen from the input device. Herein, the text display method may further include displaying a still image captured from the video at a reception time of the command on the screen.

The text display method may further include sequentially displaying a plurality of still images in thumbnails along the timeline, the plurality of still images being captured every first time interval set by equally dividing a first time period including the command reception time, within the first time period.

The text display method may further include sequentially displaying a plurality of still images captured every second time interval set by equally dividing the first time interval, in thumbnails along the timeline.

The text display method may further include displaying a menu for receiving a user command to display the plurality of still images captured every second time interval, between first and second still images displayed at the first time interval, and receiving the user command through the menu.

The text display method may further include receiving a user command for selecting one of the plurality of still images, and displaying a menu for providing at least one of save, copy, and share functions according to the user command.

The plurality of still images may be displayed according to a user command to select the displayed still image.

In another aspect of the present invention, an image display apparatus includes a display for displaying a video and text, an interface unit for receiving information about text from an input device during reproduction of the video, and a controller for controlling the display to display the text and the video received from the interface unit on the screen and to indicate inclusion of the text in the screen on a timeline of the video, displayed on the screen.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

A text display method according to an embodiment of the present invention will be described below in detail, with the attached drawings.

Figure 1:
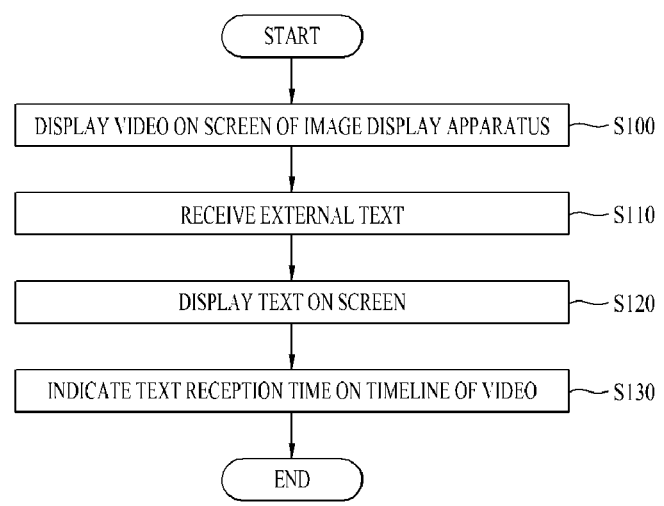
FIG. 1 is a flowchart illustrating a text display method according to an embodiment of the present invention.
Figure 2:
FIG. 2 illustrates display of a video on an image display apparatus according to an embodiment of the present invention.

FIG. 1 is a flowchart illustrating a text display method according to an embodiment of the present invention. Referring to FIG. 1, an image display apparatus reproduces a video on its screen (S100) and receives information about user-input text during video reproduction (S110). FIG. 2 illustrates exemplary display of a video on the image display apparatus according to an embodiment of the present invention. The video displayed on the image display apparatus contains any content of a broadcast program, a movie, User Created Content (UCC), etc. reproduced from a recording medium such as a broadcast, the Internet, a Digital Versatile Disk (DVD), a Blue-ray Disk (BD), etc.

The image display apparatus may receive the information about the user-input text through an input device connected to the image display apparatus, such as a mobile phone or a PC, over a wired or wireless communication network. Especially, a user may input text using a messenger program of a smart phone. Additionally, the user may input text to the image display apparatus 100 through an input device attached to the image display apparatus 100, such as a TV remote control, a keyboard, etc.

Figure 3:
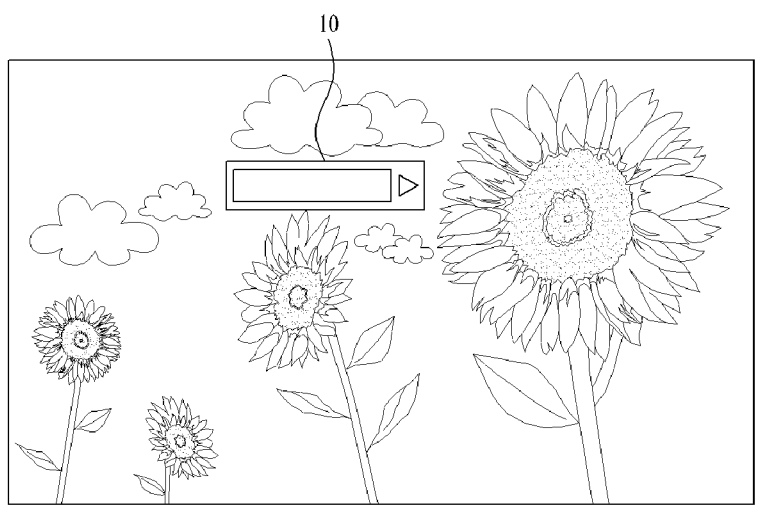
FIG. 3 illustrates a display screen displaying an input text region according to an embodiment of the present invention.

FIG. 3 illustrates a text region 10 for entering text using an input device of a mobile terminal.

Figure 4:
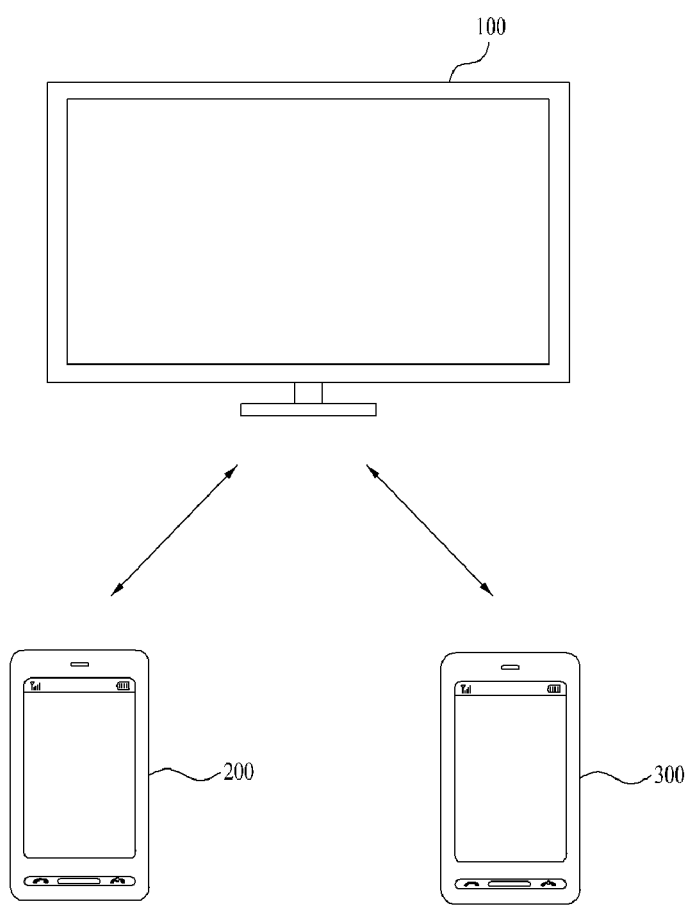
FIG. 4 illustrates input devices connected to the image display apparatus, for communication, according to an embodiment of the present invention.
Figure 5:
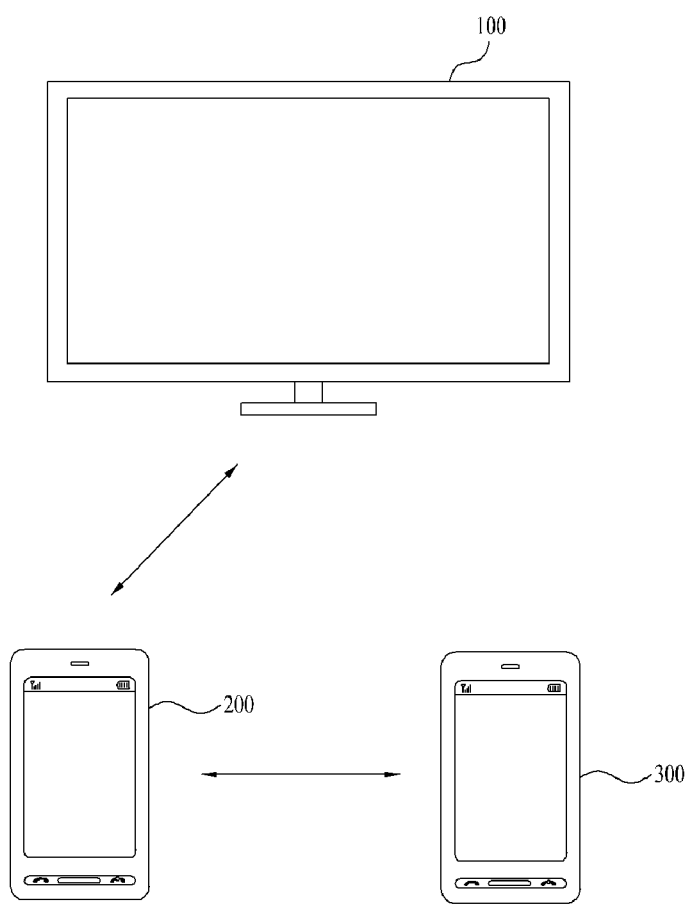
FIG. 5 illustrates setting of a text input position in the image display apparatus according to an embodiment of the present invention.

FIGS. 4 and 5 illustrate input devices 200 and 300 connected to the image display apparatus, for communication, according to an embodiment of the present invention. In particular, FIG. 4 illustrates a plurality of users may input text to an image display apparatus 100 through their input devices 200 and 300. In this embodiment of the present invention, the input devices 200 and 300 are mobile phones, by example.

Referring to FIG. 4, the input devices 200 and 300 of all users may be connected directly to the image display apparatus 100. The image display apparatus 100 receives information about text input by each user directly from the input device of the user and displays the text. For example, a viewer viewing a TV broadcast and a remote user may directly input text to a TV and display the input text on the TV using messenger programs of their mobile phones.

Referring to FIG. 5, the input devices 200 and 300 of the users may be connected to each other, for communication, and only one of the input devices 200 and 300, herein the input device 200 may be connected directly to the image display apparatus 100. The input device 200 connected to the image display apparatus 100 transmits information about text directly to the image display apparatus 100. The input device 200 also receives text information from the input device 300 not connected to the image display apparatus 100 and transmits the received text information to the image display apparatus 100. For example, the viewer viewing the TV broadcast may input text directly to the TV and display the input text on the TV using the messenger program of the mobile phone of the user. In addition, the viewer may receive information about text, which has been input by the remote user using the messenger program of his or her mobile phone, from the remote user, and may transmit the received text information to the TV so that the received text can be displayed on the TV.

The image display apparatus 100 and the input devices 200 and 300 of the users may be connected to one another via a wireless communication network such as a Wireless Fidelity (Wi-Fi) or 3$^{rd}$ Generation (3G) network.

Information about text input to the image display apparatus 100 may take the form of a text stream, a graphical image, or pixel information. The text may be decoded by a decoder corresponding to the type of the text and then displayed on the image display apparatus 100.

Figure 6:
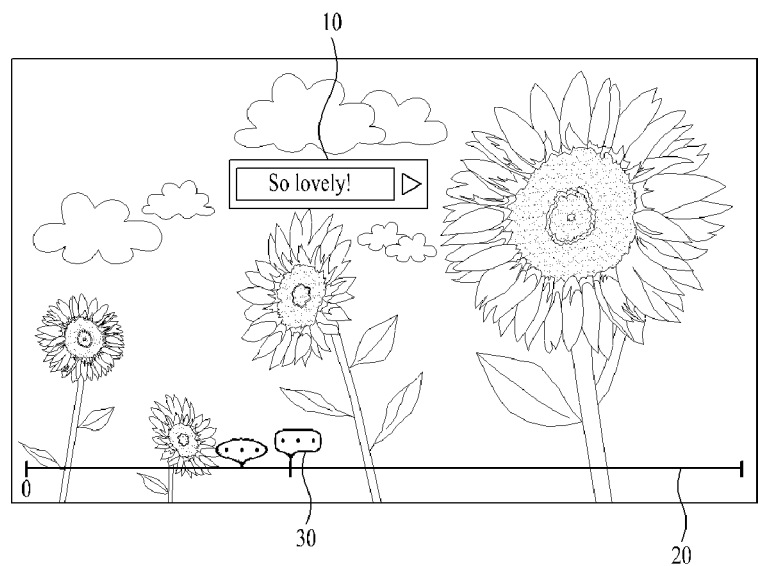
FIG. 6 illustrates allocation of a text area in the image display apparatus according to an embodiment of the present invention.

Then, the received text is displayed on the screen (S120). The user may input a command for designating a position at which the text is supposed to be displayed on the screen to the image display apparatus 100 using an input device. FIG. 6 illustrates setting of a text input position in the image display apparatus according to an embodiment of the present invention. Referring to FIG. 6, the user may designate the position of an object to be commented on using a Graphical User Interface (GUI) such as the text input window 10.

Figure 7:
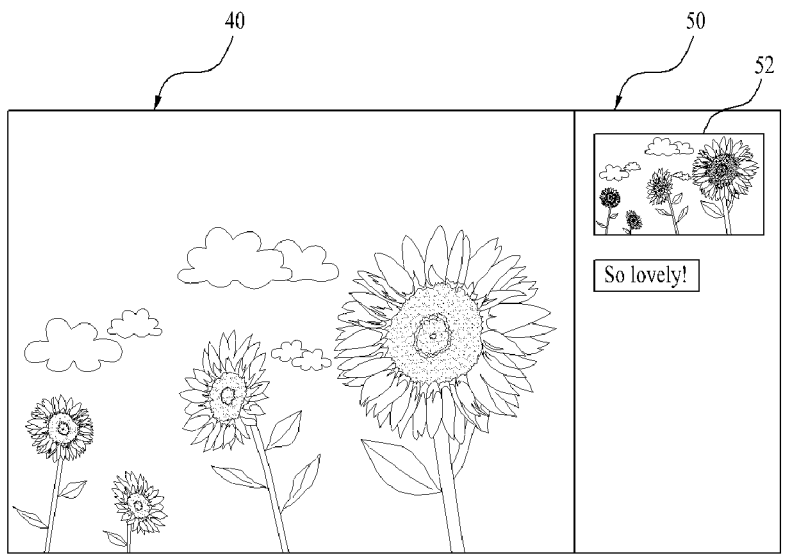
FIG. 7 illustrates a screen with input text in the image display apparatus according to an embodiment of the present invention.

Alternatively or additionally, the text may be displayed in an area other than the screen that is displaying the video. FIG. 7 illustrates allocation of a text area 50 in the image display apparatus 100 according to an embodiment of the present invention.

Referring to FIG. 7, the text area 50 is allocated separately from an area 40 in which a video is being displayed on the screen. The text may be displayed together with a still image 52 captured from the video at the moment the text is received, in the text area 50. In this manner, a user's comment and a scene that the user has made the comment on may be displayed together without interrupting video reproduction.

The reception time of the text is indicated on a timeline 20 of the video on the screen (S130). FIG. 6 illustrates a display of a timeline 20 on which the text reception time is indicated, along with a screen with the input text in the image display apparatus 100 according to an embodiment of the present invention. Referring to FIG. 6, the user inputs a comment in the text input window 10. Herein, the timeline 20 of the video is displayed on the screen of the image display apparatus 100 and the text reception time is indicated on the timeline 20. That is, an indication 30 representing the comment is marked on the timeline 20. As the comment reception time is indicated, the user can readily identify a part of the video related to a scene that the user has commented on.

Meanwhile, when a plurality of users input text, the users may be identified by allocating text input windows 10 and indications 30 in different icons or colors to them.

Figure 8:
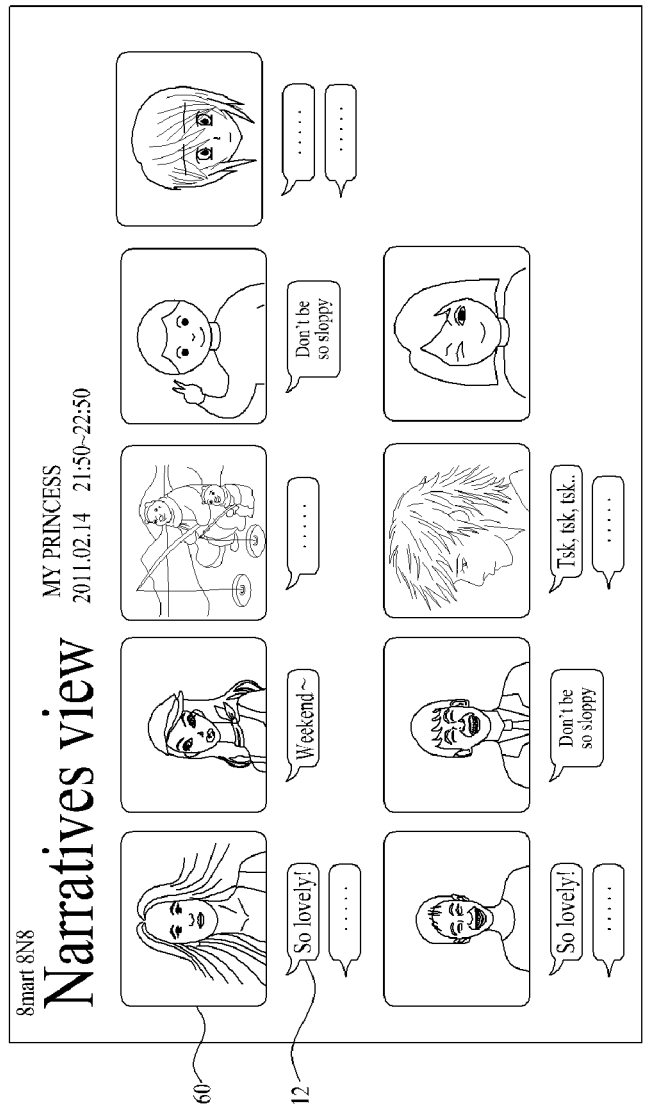
FIG. 8 illustrates display of captured still images and user comments made on the captured still images in the image display apparatus according to an embodiment of the present invention.

In the above operation, the user-input comment displayed on the screen is stored along with the associated still image. FIG. 8 illustrates a display of captured still images 60 and user comments 12 made on the captured still images 60 in the image display apparatus 100 according to an embodiment of the present invention. As illustrated in FIG. 8, the user may share the still images 60 and the comments 12 that are stored in the form of a log with other persons within a sharing group through an email or an SNS site.

With reference to FIGS. 9 to 15, a detailed description will be given below of an operation for capturing a still image from a video in the text display method according to an embodiment of the present invention.

Figure 9:
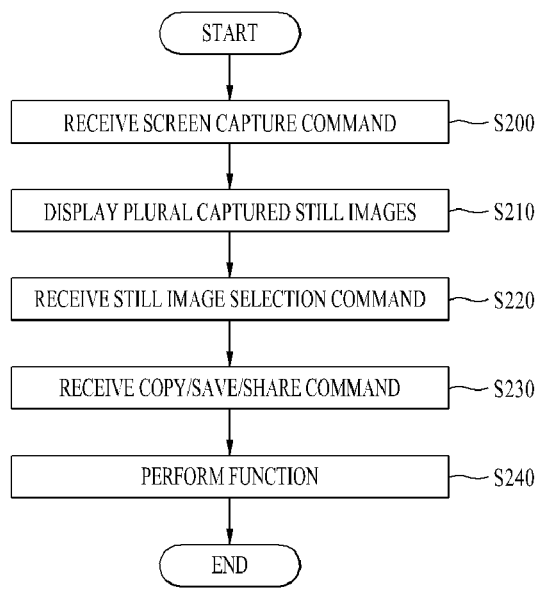
FIG. 9 is a flowchart illustrating an operation for capturing a still image from a video in the text display method according to an embodiment of the present invention.

FIG. 9 is a flowchart illustrating an operation for capturing a still image from a video in the text display method according to an embodiment of the present invention. Referring to FIG. 9, a screen capture command is received from the user (S200). As described before, the screen capture command may be issued simultaneously with the user's input of text or the user's command to designate a position at which the text is to be displayed on the screen. In the afore-described example, upon input of text from the user, a screen capture operation may be performed even without a screen capture command.

Figure 10:
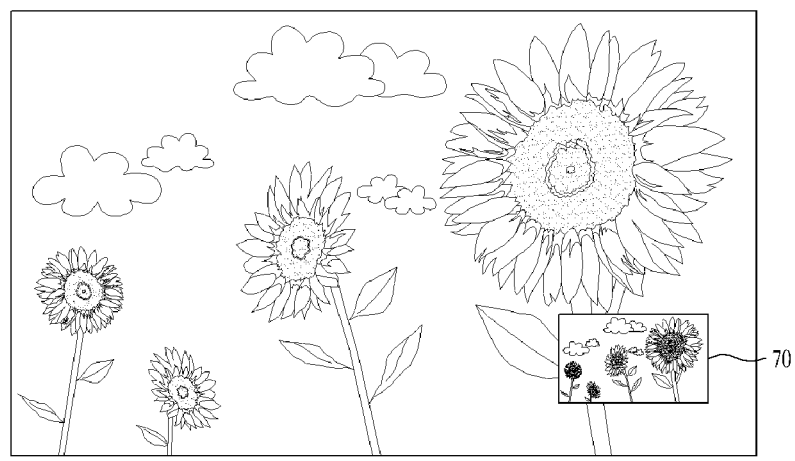
FIG. 10 illustrates a display of a screen with an image captured at a capture command reception time in the image display apparatus according to an embodiment of the present invention.

FIG. 10 illustrates a display of a screen with an image captured at a reception time of the screen capture command in the image display apparatus 100 according to an embodiment of the present invention. Referring to FIG. 10, a captured still image 70 may be overlaid over the video, in a window at a predetermined position of the screen.

Figure 11:
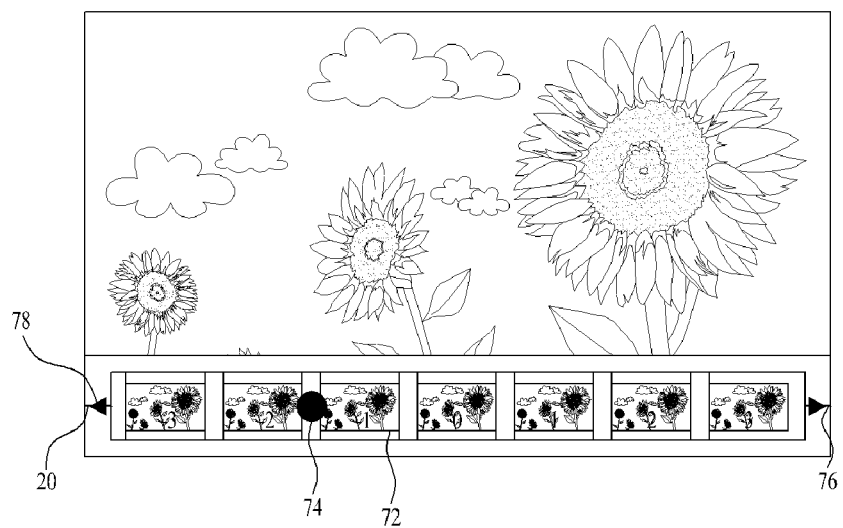
FIG. 11 illustrates a display of a screen with still images captured every first time interval in the image display apparatus according to an embodiment of the present invention.

Then a plurality of captured still images are displayed on the screen (S210). FIG. 11 illustrates a display of a screen with a plurality of captured still images 72 in the image display apparatus 100 according to an embodiment of the present invention. In this embodiment of the present invention, the plurality of still images 72 captured every first time interval within a first time period including the reception time of the screen capture command are sequentially displayed in thumbnails along the timeline 20. The first time interval is calculated by equally dividing the first time period. For example, a GUI is activated for the still image 70 illustrated in FIG. 10. Upon receipt of a user command to select the GUI, the plurality of still images 72, which have been captured every second for 10 seconds including the reception time of the screen capture command, are displayed. The plurality of still images 72 may be sequentially displayed in thumbnails along the timeline 20 of the video.

The user may open and select the still images 72 arranged in thumbnails using directional keys 76 and 78 activated on the screen. As the plurality of still images 72 captured during a predetermined time period before and after the reception time of the screen capture command are provided, the user can detect a desired scene.

In addition, a menu is displayed to receive a user command for displaying a plurality of still images 80 captured every second time interval, between first and second still images displayed at the first time interval. For instance, a GUI 74 may be activated between a thumbnail representing a still image captured at −1 second and a thumbnail representing a still image captured at −2 second in order to allow the user to enter a user command for displaying the plurality of still images 80 captured every 0.1 second during the time period between the still images.

Figure 12:
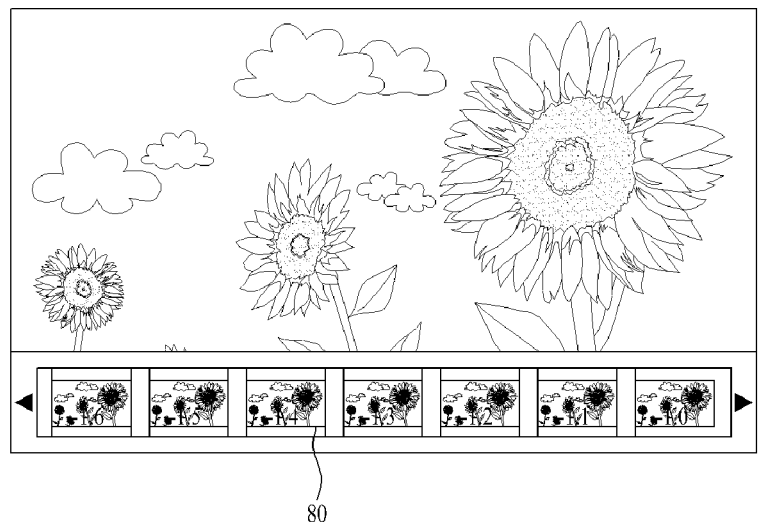
FIG. 12 illustrates a display of a screen with still images captured every second time interval in the image display apparatus according to an embodiment of the present invention.

Upon receipt of the user command through the GUI, the plurality of still images captured every second time interval are sequentially displayed in thumbnails along the timeline 20. The second time interval is calculated by equally dividing the first time interval. As illustrated in FIG. 12, for example, the plurality of still images 80 captured every 0.1 second during the time period between −1 second and −2 second may be sequentially displayed along the timeline 20. Therefore, the user can achieve a still image captured at a more accurate desired time.

Figure 13:
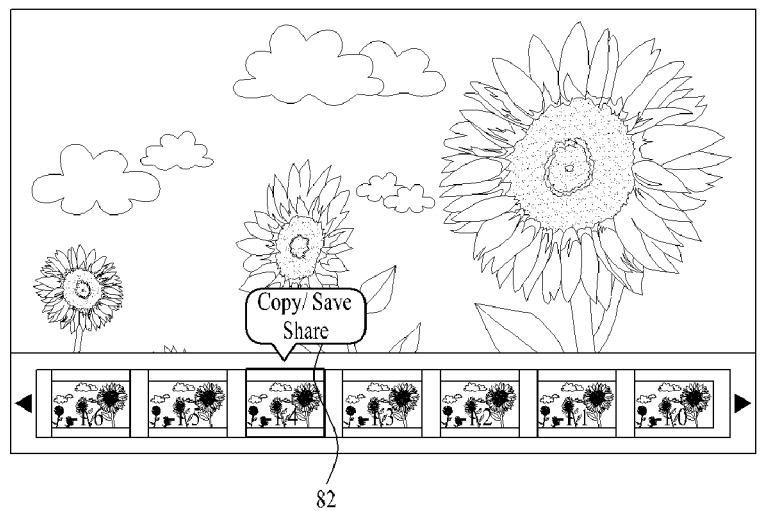
FIG. 13 illustrates a display of a screen that provides a Copy, Save, and Share menu for one of a plurality of still images in the image display apparatus according to an embodiment of the present invention.

A user command to select one of the plurality of still images is received (S220). A menu for providing at least one of copy, save and share functions is displayed for the still image selected according to the user command. FIG. 13 illustrates a display of a screen that provides a Copy, Save, and Share menu for a selected still image in the image display apparatus 100 according to an embodiment of the present invention. When the user selects a specific still image through an activated GUI, a GUI for copying, saving and sharing the selected still image is activated on the screen.

Figure 14:
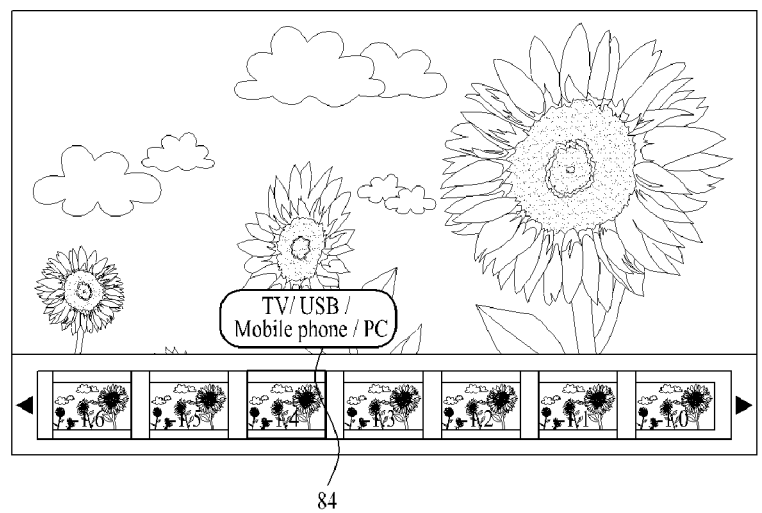
FIG. 14 illustrates a display of a screen that provides a storage medium menu, upon selection of Save in the Copy, Save, and Share menu illustrated in FIG. 13 in the image display apparatus according to an embodiment of the present invention.
Figure 15:
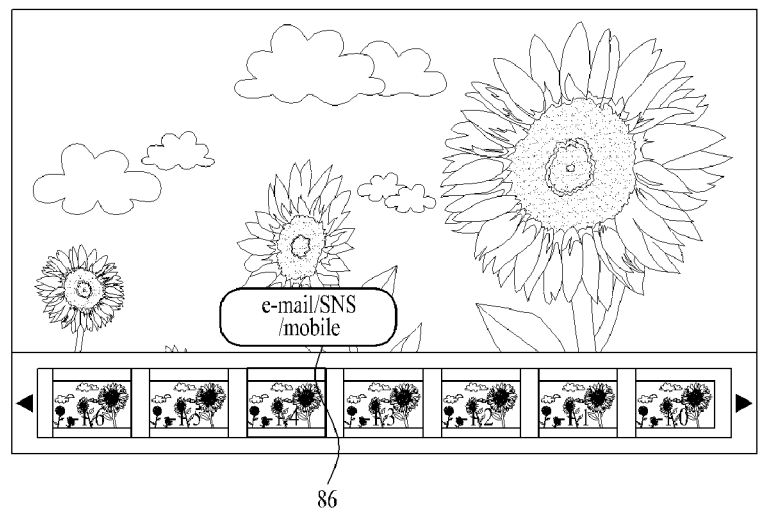
FIG. 15 illustrates a display of a screen that provides a sharing option menu, upon selection of Share in the Copy, Save, and Share menu illustrated in FIG. 13 in the image display apparatus according to an embodiment of the present invention.

A copy, save or share command is received for the selected still image (S230). For example, when the user selects the save command for the still image, a menu 84 is activated on the screen to allow the user to select a storage medium, as illustrated in FIG. 14. If the user selects the share command for the still image, a menu 86 is activated on the screen to allow the user to select a sharing option, as illustrated in FIG. 15. Then a function corresponding to the user command input through the GUI is performed (S240).

Figure 16:
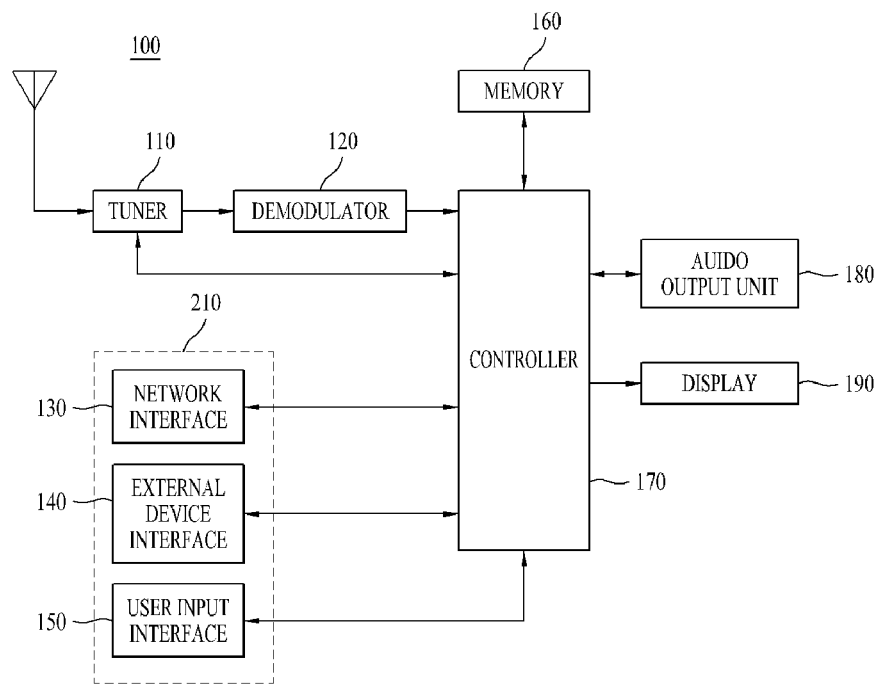
FIG. 16 is a block diagram of the image display apparatus according to the embodiment of the present invention.

Now a detailed description will be given of the image display apparatus 100 according to an embodiment of the present invention. FIG. 16 is a block diagram of the image display apparatus 100 according to an embodiment of the present invention.

Referring to FIG. 16, the image display apparatus 100 includes a tuner 110, a demodulator 120, an interface unit 210, a memory 160, a controller 170, a display 190, and an audio output unit 180.

The tuner 110 selects a Radio Frequency (RF) broadcast signal corresponding to a channel selected by a user or a number of RF broadcast signals corresponding to all broadcast channels previously added to the image display apparatus 100 from among a plurality of RF broadcast signals received through an antenna and downconverts the selected RF broadcast signal into a digital Intermediate Frequency (IF) signal or an analog baseband Audio/Video (A/V) signal. More specifically, if the selected RF broadcast signal is a digital broadcast signal, the tuner 110 downconverts the selected RF broadcast signal into a digital IF signal, DIF. On the other hand, if the selected RF broadcast signal is an analog broadcast signal, the tuner 110 downconverts the selected RF broadcast signal into an analog baseband A/V signal, CVBS/SIF. That is, the tuner 110 may be a hybrid tuner capable of processing not only digital broadcast signals but also analog broadcast signals. The analog baseband A/V signal CVBS/SIF may be directly input to the controller 170.

The tuner 110 may be capable of receiving RF broadcast signals from an Advanced Television Systems Committee (ATSC) single-carrier system or from a Digital Video Broadcasting (DVB) multi-carrier system.

In addition, the tuner 110 may sequentially select a number of RF broadcast signals corresponding to all broadcast channels previously added to the image display apparatus 100 by a channel add function from among a plurality of RF signals received through the antenna, and may downconvert the selected RF broadcast signals into IF signals or baseband A/V signals.

The demodulator 120 receives the digital IF signal DIF from the tuner 110 and demodulates the digital IF signal DIF. For example, if the digital IF signal DIF is an ATSC signal, the demodulator 120 may perform 8-Vestigal SideBand (VSB) demodulation on the digital IF signal DIF. The demodulator 120 may also perform channel decoding. For channel decoding, the demodulator 120 may include a Trellis decoder, a deinterleaver, and a Reed-Solomon decoder so as to perform Trellis decoding, deinterleaving and Reed-Solomon decoding. For example, if the digital IF signal DIF is a DVB signal, the demodulator 120 performs Coded Orthogonal Frequency Division Multiple Access (COFDMA) demodulation on the digital IF signal DIF. The demodulator 120 may also perform channel decoding. For channel decoding, the demodulator 120 may include a convolution decoder, a deinterleaver, and a Reed-Solomon decoder so as to perform convolution decoding, deinterleaving, and Reed-Solomon decoding.

The demodulator 120 may perform demodulation and channel decoding on the digital IF signal DIF received from the tuner 110, thereby obtaining a stream signal TS. The stream signal TS may be a signal in which a video signal, an audio signal, and/or a data signal are multiplexed. For example, the stream signal TS may be an MPEG-2 TS signal obtained by multiplexing an MPEG-2 video signal and a Dolby AC-3 audio signal. An MPEG-2 TS may include a 4-byte header and a 184-byte payload.

In order to properly handle not only ATSC signals but also DVB signals, the demodulator 120 may include an ATSC demodulator and a DVB demodulator.

The stream signal TS is input to the controller 170. The controller 170 may demultiplex the stream signal TS into a number of signals, subject the demultiplexed signals to video and/or audio signal process, and output the processed signals as video data to the display 190 and as audio data to the audio output unit 180.

The interface unit 210 includes a network interface 130, an external device interface 140, and a user input interface 150. The interface unit 210 receives information about text input by a user via the network interface 130 or the user input interface 150 during reproducing a video.

The network interface 130 interfaces between the image display apparatus 100 and a wired/wireless network such as the Internet. For connection to a wired network, the network interface 130 may have an Ethernet port. For connection to a wireless network, the network interface 130 may include a communication port conforming to communication standards such as Wireless Local Area Network (WLAN) (i.e. Wi-Fi), Wireless Broadband (WiBro), World Interoperability for Microwave Access (WiMax), and High Speed Downlink Packet Access (HSDPA).

The network interface 130 may receive content or data from the Internet, a content provider, or a network provider over a network. The received content or data may include content such as games, advertisements, Video-on-Demand (VoD) files, and broadcast signals, and information related to the content. The network interface 130 may also receive update information and update files of firmware from a network operator. The network interface 130 may transmit data to the Internet, the content provider, or the network operator.

The network interface 130 may be connected to, for example, an Internet Protocol (IP) TV. To enable interactive communication, the network interface 130 may provide a video, audio and/or data signal received from an IPTV set-top box to the controller 170 and may provide signals processed by the controller 170 to the IPTV set-top box.

The term 'IPTV' as used herein covers a broad range of services, depending on transmission networks, such as Asynchronous Digital Subscriber Line-TV (ADSL-TV), Very high data rate Digital Subscriber Line-TV (VDSL-TV), Fiber To The Home-TV (HTTH-TV), TV over DSL, Video over DSL, TV over IP (TVIP), Broadband TV (BTV), and Internet TV and full-browsing TV, which are capable of providing Internet access services.

The external device interface 140 may transmit data to or receive data from an external device. For the purpose, the external device interface 140 may include an A/V Input/Output (I/O) unit and a wireless communication module. The external device interface 140 may be connected wirelessly or by cable to an external device such as a Digital Versatile Disc (DVD) player, a Bluray player, a game console, a camera, a camcorder, or a computer (e.g., a laptop computer). Then, the external device interface 140 externally receives a video, audio, and/or data signal from the external device and transmits the received external input signal to the controller 170. In addition, the external device interface 140 may output video, audio, and data signals processed by the controller 170 to the external device.

In order to receive or transmit A/V signals from or to the external device, the A/V I/O unit of the external device interface 140 may include a Universal Serial Bus (USB) port, a Composite Video Banking Sync (CVBS) port, a Component port, a Super-video (S-video) (analog) port, a Digital Visual Interface (DVI) port, a High-Definition Multimedia Interface (HDMI) port, a Red-Green-Blue (RGB) port, and a D-sub port.

The external device interface 140 may be connected to various set-top boxes through at least one of the afore-mentioned ports and may thus receive data from or transmit data to the various set-top boxes.

The user input interface 150 transmits a signal received from a user to the controller 170 or transmits a signal received from the controller 170 to the user. For example, the user input interface 150 may receive various user input signals such as a power-on/off signal, a channel selection signal, and a screen setting signal from a remote control or may transmit a signal received from the controller 170 to the remote control, according to various communication schemes, for example, RF communication and InfraRed (IR) communication.

For example, the user input interface 150 may provide the controller 170 with user input signals or control signals received from local keys, such as inputs of a power key, a channel key, and a volume key, and setting values.

Also, the user input interface 150 may transmit a user input signal received from a sensor unit that senses a user's gesture to the controller 170 or transmit a signal received from the controller 170 to the sensor unit. The sensor unit may include a touch sensor, a voice sensor, a position sensor, a motion sensor, etc.

The memory 160 may store various programs used for the controller 170 to process and control signals, and may also store processed video, audio and data signals. The memory 160 may temporarily store a video, audio or data signal received from the external device interface 140. The memory 160 may store information about broadcast channels identified through the channel add function, such as a channel map.

The memory 160 may include, for example, at least one of a flash memory-type storage medium, a hard disk-type storage medium, a multimedia card micro-type storage medium, a card-type memory (e.g. a Secure Digital (SD) or eXtreme Digital (XD) memory), a Random Access Memory (RAM), or a Read-Only Memory (ROM) such as an Electrically Erasable Programmable ROM (EEPROM). The image display apparatus 100 may open a file (such as a video file, a still image file, a music file, or a text file) stored in the memory 160 to the user.

While the memory 160 is shown in FIG. 16 as configured separately from the controller 170, to which the present invention is not limited, the memory 160 may be incorporated into the controller 170, for example.

The controller 170 demultiplexes the stream signal TS received from the tuner 110, the demodulator 120, or the external device interface 140 and process the demultiplexed signals so that the processed signals can be output as audio and video data.

The video signal processed by the controller 170 may be displayed as an image on the display 190. The video signal processed by the controller 170 may also be transmitted to an external output device through the external device interface 140.

The audio signal processed by the controller 170 may be output as sound to the audio output unit 180. Also, the audio signal processed by the controller 170 may be transmitted to the external output device through the external device interface 140.

In addition, the controller 170 may provide overall control to the image display apparatus 100. For example, the controller 170 may control tuning of the tuner 110 to an RF broadcast corresponding to a user-selected channel or a pre-stored channel. The controller 170 may control the image display apparatus 100 according to a user command received through the user input interface 150 or according to an internal program. For example, the controller 170 controls the tuner 110 to receive a signal of a channel selected according to a specific channel selection command received through the user input interface 150 and processes a video, audio and/or data signal of the selected channel. The controller 170 outputs the processed video or audio signal along with information about the user-selected channel to the display 190 or the audio output unit 180.

In another example, the controller 170 outputs a video or audio signal received from an external device such as a camera or a camcorder through the external device interface 140 to the display 190 or to the audio output unit 180 according to an external device video play command received through the external device interface 140.

The controller 170 may control display of images on the display 190. For instance, the controller 170 may control the display 190 to display a broadcast image received from the tuner 110, an external image received through the external device interface 140, an image received through the network interface 130, or an image stored in the memory 160.

The image displayed on the display 190 may be a two-dimensional (2D) or 3D still image or moving picture.

The display 190 generates drive signals by converting a processed video signal, a processed data signal, an On Screen Display (OSD) signal, and a control signal received from the controller 170 or a video signal, a data signal, and a control signal received from the external device interface 140.

The display 190 may be various types of displays such as a Plasma Display Panel (PDP), a Liquid Crystal Display (LCD), an Organic Light-Emitting Diode (OLED) display, and a flexible display.

The display 190 may also be a touch screen that can be used not only as an output device but also as an input device.

The audio output unit 180 may receive a processed audio signal (e.g., a stereo signal, a 3.1-channel signal or a 5.1-channel signal) from the controller 170 and output the received audio signal as voice. The audio output unit 180 may be various types of speakers.

To sense a user's gesture, the image display apparatus 100 may further include the sensor unit that has at least one of a touch sensor, a voice sensor, a position sensor, or a motion sensor, as stated before. A signal sensed by the sensor unit may be output to the controller 170 through the user input interface 150.

The controller 170 may sense a user's gesture from an image captured by a camera unit or a signal sensed by the sensor unit, or by combining the captured image and the sensed signal.

The above-described image display apparatus 100 may be a fixed digital broadcast receiver capable of receiving at least one of ATSC (8-VSB) broadcast programs, DVB-T (COFDM) broadcast programs, and ISDB-T (BST-OFDM) broadcast programs. Alternatively, the image display apparatus 100 may be a mobile digital broadcast receiver capable of at least one of terrestrial DMB broadcast programs, satellite DMB broadcast programs, ATSC-M/H broadcast programs, DVB-H (COFDM) broadcast programs, and Media Forward Link Only (MediaFLO) broadcast programs, or a mobile digital broadcast receiver capable of receiving cable, satellite and/or IPTV broadcast programs.

The image display apparatus 100 as set forth herein may be any of a TV receiver, a mobile phone, a smart phone, a laptop computer, a digital broadcast terminal, a Personal Digital Assistant (PDA), a Portable Multimedia Player (PMP), etc.

The block diagram of the image display apparatus 100 illustrated in FIG. 16 is an embodiment of the present invention. The image display apparatus 100 is shown in FIG. 16 as having a number of components in a given configuration. However, the image display apparatus 100 may include fewer components or more components than those shown in FIG. 16 in alternative embodiments. Also, two or more components of the image display apparatus 100 may be combined into a single component or a single component thereof may be separated into two more components in alternative embodiments. The functions of the components of the image display apparatus 100 as set forth herein are illustrative in nature and may be modified, for example, to meet the requirements of a given application.

Figure 17:
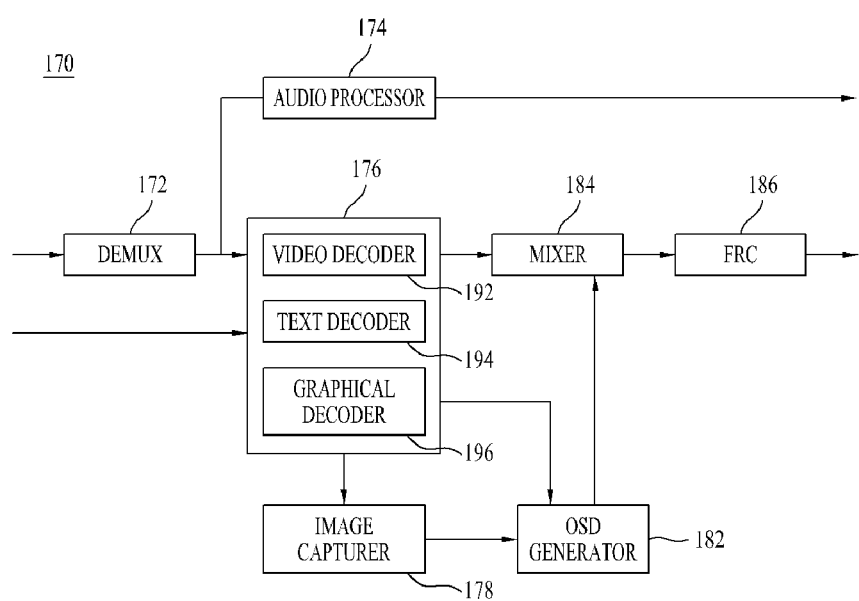
FIG. 17 is a block diagram of a controller illustrated in FIG. 16.

FIG. 17 is a detailed block diagram of the controller 170. Referring to FIG. 17, the controller 170 includes a Demultiplexer (DEMUX) 172, a video processor 176, an audio processor 174, an image capturer 178, an OSD generator 182, a mixer 184, and a Frame Rate Converter (FRC) 186. The controller 170 may further include a data processor.

The DEMUX 172 demultiplexes an input stream signal TS. For example, the DEMUX 172 may demultiplex an MPEG-2 TS into a video signal, an audio signal, and a data signal. The input stream signal TS may be received from the tuner 110, the demodulator 120 or the external device interface 140.

The video processor 176 may process the demultiplexed video signal, text stream, or graphic image stream. For the processing, the video processor 176 may include a video decoder 192, a text decoder 194, and a graphic decoder 196.

The video decoder 192 decodes the demultiplexed video signal. The video decoder 192 may be provided with decoders that operate based on various standards. The video decoder 192 may include at least one of an MPEG-2 decoder, an H.264 decoder, an MPEC-C decoder, an MVC decoder, or an FTV decoder. The video decoder 192 may further include a 3D video decoder for decoding a 3D signal.

The text decoder 194 decodes a text stream signal received from the DEMUX 172 or input by the user.

The graphic decoder 196 decodes a graphic image stream signal received from the DEMUX 172 or input by the user.

The image capturer 178 captures a still image of video data according to a capture command or text input by the user and outputs the captured still image to the OSD generator 182.

The OSD generator 182 generates an OSD signal autonomously or according to a user input. For example, the OSD generator 182 generates signals by which a variety of information is displayed as graphics or text on the display 190, according to user text input signals. The OSD generator 182 also generates a signal by which the still image received from the image capturer 178 is displayed. The OSD signal may include various data such as a User Interface (UI), a variety of menus, widgets, icons, etc. Also, the OSD signal may include a 2D object and/or a 3D object.

The mixer 184 mixes the decoded video signal processed by the video processor 176 with the OSD signal generated from the OSD generator 182. The OSD signal and the decoded video signal each may include at least one of a 2D signal or a 3D signal.

The FRC 186 changes the frame rate of the mixed video signal received from the mixer 184. For example, a frame rate of 60 Hz is converted into a frame rate of 120 or 240 Hz. When the frame rate is changed from 60 Hz to 120 Hz, the same first frame is inserted between a first frame and a second frame, or a third frame predicted from the first and second frames is inserted between the first and second frames. If the frame rate is changed from 60 Hz to 240 Hz, three identical frames or three predicted frames may be inserted between the first and second frames.

The FRC 186 may output a received video signal without frame rate conversion. Preferably, upon receipt of a 2D image signal, the FRC 186 may simply output the 2D image signal without frame rate conversion. Upon receipt of a 3D image signal, the FRC 186 may convert the frame rate of the 3D image signal in the above-described manner.

Now a detailed description will be given of displaying user-input text on the image display apparatus 100 having the above configuration according to an embodiment of the present invention.

The controller 170 first reproduces a video and controls display of the reproduced video on the screen of the display 190. The video displayed on the image display apparatus 100 may include any of a broadcast received through the tuner 110, content received from the Internet through the network interface 130, and content received from a recording medium such as a DVD and a BD through the external device interface 140.

The interface unit 210 receives information about text input by the user during reproduction of the video. For example, information about user-input text may be received at the network interface 130 or the external device interface 140 through an input device connected to the image display apparatus 100, such as a mobile phone or a PC, over a wired or wireless communication network. The image display apparatus 100 may also receive text information from an input device attached to the image display apparatus 100, such as a TV remote control or a keyboard, through the user input interface 150.

As illustrated in FIGS. 3 and 4, a plurality of users may input text to the image display apparatus 100 through their respective input devices.

Input devices of all users may be connected directly to the image display apparatus 100, as illustrated in FIG. 3. In this instance, the image display apparatus 100 receives information about user-input text directly from each user and displays the received text. For example, a viewer viewing a TV broadcast and a remote user may input text directly to a TV using their own mobile phones and display the text on the TV.

Meanwhile, as illustrated in FIG. 4, the input devices 200 and 300 of the users may be connected to each other, for communication and only one of the input devices 200 and 300, herein only the input device 200 may be connected directly to the image display apparatus 100. The input device 200 transmits information about text directly to the image display apparatus 100, and receives text information from the input device 300 not connected to the image display apparatus 100 and transmits the received text information to the image display apparatus 100. For instance, the viewer viewing the TV broadcast may input text directly to the TV using his or her mobile phone and display the text on the TV. In addition, the viewer may receive from the remote controller information about text that has been input by the remote user through his or her mobile phone and transmit the received text information to the TV so as to display the text information on the TV.

The image display apparatus 100 and the input devices 200 and 300 may be connected to one another via a wireless communication network such as a Wi-Fi or 3G network.

Information about text input to the image display apparatus 100 may take the form of a text stream, a graphical image, or pixel information. After being decoded by the text decoder 194 or the graphical decoder 196 in the controller 170, the text may be displayed.

The controller 170 controls display of the user-input text on the screen of the display 190. The user may input a command to designate a text display position on the screen to the image display apparatus 100 through an input device. As illustrated in FIG. 6, the user may designate the position of an object to be commented on using a GUI such as the text input window 10 on the screen. Alternatively or additionally, the controller 170 may control the display 190 to display the text in an area separate from a screen displaying a video. As illustrated in FIG. 7, the controller 170 allocates the text area 50 separate from the video display area of the screen. The controller 170 may control display of the still image 52 captured from the video at a text reception time together with the text in the text area 50. Thus, the comment and the scene that the user has made the comment on can be displayed together without interrupting reproduction of the video.

The controller 170 controls display of the text reception time on the timeline 20 of the video on the screen. As illustrated in FIG. 6, the user enters a comment in the text input window 10. The controller 170 controls display of the timeline 20 of the video on the screen of the display 190 and display of the indication 30 representing the comment on the timeline 20. Because the comment reception time of the user is indicated in this manner, the user can readily identify a part of the video associated with the commented scene.

When a plurality of users input text, the controller 170 may allocate text input windows and indications in different icons or colors to identify the users.

In the above operation, the comment entered by the user and displayed on the screen are stored along with the associated still image. The user may share the stored still image and comment with other persons through an email or an SNS site.

An operation for capturing a still image from a video in the image display apparatus 100 according to an embodiment of the present invention will be described below in detail.

The user interface 210 receives a screen capture command from the user. As stated before, the screen capture command may be issued simultaneously with a user's input of text or a user's command to designate a text display position on the screen. In the afore-described example, upon input of text from the user, the controller 170 may control a screen capture operation to be performed even without receiving a screen capture command. As illustrated in FIG. 10, the captured still image 70 may be overlaid over the video, in a window at a predetermined position of the screen.

The controller 170 controls display of a plurality of captured still images on the screen. To be more specific, the image capturer 178 of the controller 170 may capture still images every first time interval set by equally dividing the first time period including a capture command reception time, within the first time period, and may sequentially display the captured still images in thumbnails along the timeline 20.

For example, a GUI is activated for the still image 70 illustrated in FIG. 11. Upon receipt of a user command to select the GUI, the plurality of still images 72 captured every second for 10 seconds including the capture command reception time are displayed. The plurality of still images 72 may be sequentially displayed in thumbnails along the timeline 20 of the video.

The user may open and select the still images 72 arranged in thumbnails using directional keys that have been activated on the screen. The user input interface 150 receives a still image selection command.

A menu for receiving a user command to display the plurality of still images 80 every second time interval between first and second still images displayed at the first time interval is displayed on the display 190.

For instance, a GUI is activated on the display 190, through which the user enters a command to display the plurality of still images 80 captured every 0.1 second during the time period between the thumbnails of a still image captured at −1 second and a still image captured at −2 second.

Upon receipt of the user command through the GUI through the interface unit 210, the controller 170 may control sequential display of the plurality of still images 80 captured every second time interval set by equally dividing the first time interval in thumbnails along the timeline 20. For instance, as illustrated in FIG. 12, the plurality of still images 80 captured every 0.1 second during the time period between −1 second and −2 second may be sequentially displayed along the timeline 20.

The interface unit 210 receives a user command to select one of the plurality of still images, and the OSD generator 182 displays a menu for providing at least one of save, copy and share functions for a still image selected according to the user command. As illustrated in FIG. 13, when the user selects a particular still image through an activated GUI, a GUI for copying, saving and sharing the selected still image is activated and displayed on the screen.

Then the interface unit 210 receives a copy, save or share command for the selected still image. For example, if the user selects the save command for the still image, the menu 84 for selecting a storage medium is displayed as illustrated in FIG. 14. If the user selects the share command for the still image, the menu 84 for selecting a sharing option is displayed as illustrated in FIG. 15. The controller 170 controls performing of a function corresponding to a user command input through the GUI.

As is apparent from the above description of the present invention, a user can readily post a comment associated with a video reproduced in an image display apparatus, on the image display apparatus.

The user can readily share the input comment with other users.

Further, the user can readily capture a scene associated with the comment.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of displaying text information on an image display apparatus, the method comprising:
   receiving, via an interface unit of the image display apparatus, an input signal indicating at least one mobile terminal is connected to the image display apparatus;
   receiving, via the interface unit of the image display apparatus, text information input on the at least one mobile terminal during reproduction of a video displayed on the image display apparatus;
   displaying the text information on a display unit of the image display apparatus, said text information being input in a text input window displayed on the video;
   displaying, on the display unit, a timeline indicating a time length of the displayed video; and
   displaying an indication on the timeline,
   wherein when a capture command is received, a plurality of first still images, a plurality of directional keys and an activation menu are arranged on the timeline,
   wherein the plurality of first still images are arranged on a central portion of the timeline, wherein the plurality of directional keys are arranged on an edge portion of the timeline, wherein the activation menu is arranged between adjacent first still images, wherein the plurality of first still images have a first time interval within a time period including a reception time of the capture command, wherein when the activation menu is selected, the plurality of first still images are removed from the central portion of the time line, and a plurality of second still images are arranged on the central portion of the timeline, and wherein the plurality of second still images have a second time interval within the first time interval between adjacent first still images.

2. The method of claim 1, wherein the at least one mobile terminal includes a plurality of mobile terminals, and the received text information is received from any one of the plurality of mobile terminals.

3. The method of claim 2, wherein the plurality of mobile terminals are directly connected to the image display apparatus.

4. The method of claim 2, wherein said any one of the plurality of mobile terminals is directly connected to the image display apparatus, and at least one other mobile terminal is directly connected to said any one of the mobile terminals, and wherein said at least one other mobile terminal first transmits the text information to said any one of the plurality of mobile terminals, and then said any one of the plurality of mobile terminals transmits the text information to the image display apparatus.

5. The method of claim 1, wherein the received text information further includes at least one of a graphical image and pixel information.

6. The method of claim 1, wherein the displaying the text information comprises:

allocating a text area separate from a video display area displaying the video; and displaying the text information in the allocated text area.

7. The method of claim 6, wherein the displaying the text information in the text area comprises displaying the text information together with the still image captured from the video at the text information input time in the text area.

8. The method of claim 1, further comprising:

receiving, from said at least one mobile terminal, a command for designating a text display position for displaying the text information on the display unit of the image display apparatus.

9. The method of claim 8, further comprising:

displaying the still image captured from the video at a reception time of the command on the display unit of the image display apparatus.

10. The method of claim 9, further comprising:

sequentially displaying a plurality of still images in thumbnails along the timeline, the plurality of still images being captured at first equal time intervals.

11. The method of claim 10, further comprising:

sequentially displaying the plurality of still images in the thumbnails along the timeline, the plurality of still images being captured at second equal time intervals, wherein the second equal time intervals are less than the first equal time intervals.

12. The method of claim 11, further comprising:

displaying a menu for receiving an input command to display the plurality of still images captured every second time interval, between first and second still images displayed at the first time interval; and receiving the input command through the menu.

13. The method of claim 10, further comprising:

receiving an input command for selecting one of the plurality of still images; and displaying a menu for providing at least one of save, copy, and share functions according to the input command.

14. An image display apparatus for performing a text information displaying process, the apparatus comprising:

a processor configured to receive a signal indicating at least one mobile terminal is connected to the image display apparatus, and to receive text information input on the at least one mobile terminal during reproduction of a video displayed on the image display apparatus; and a display unit configured to display the text information, to display a timeline indicating a time length of the displayed video and to display an indication on the timeline, said text information being input in a text input window displayed on the video, wherein when a capture command is received, a plurality of first still images, a plurality of directional keys and an activation menu are arranged on the timeline, wherein the plurality of first still images are arranged on a central portion of the timeline, wherein the plurality of directional keys are arranged on an edge portion of the timeline, wherein the activation menu is arranged between adjacent first still images wherein the plurality of first still images have a first time interval within a time period including a reception time of the capture command, wherein when the activation menu is selected, the plurality of first still images are removed from the central portion of the time line, and a plurality of second still images are arranged on the central portion of the timeline, and wherein the plurality of second still images has a second time interval within the first time interval between adjacent first still images.

15. The apparatus of claim 14, wherein the at least one mobile terminal includes a plurality of mobile terminals, and the received text information is received from any one of the plurality of mobile terminals.

16. The apparatus of claim 15, wherein the plurality of mobile terminals are directly connected to the image display apparatus.

17. The apparatus of claim 15, wherein said any one of the plurality of mobile terminals is directly connected to the image display apparatus, and at least one other mobile terminal is directly connected to said any one of the mobile terminals, and wherein said at least one other mobile terminal first transmits the text information to said any one of the plurality of mobile terminals, and then said any one of the plurality of mobile terminals transmits the text information to the image display apparatus.

18. The apparatus of claim 14, wherein the received text information further includes at least one of a graphical image and pixel information.

19. The apparatus of claim 14, further comprising:

a controller configured to control the display unit to allocate a text area separate from a video display area displaying the video, and to display the text information in the allocated text area.

20. The apparatus of claim 19, wherein the display unit is further configured to display the text information together with the still image captured from the video at the text information input time in the text area.

21. The apparatus of claim 14, wherein the interface unit is further configured to receive from said at least one mobile terminal, a command for designating a text display position for displaying the text information on the display unit of the image display apparatus.

22. The apparatus of claim 21, wherein the display unit is further configured to display the still image captured from the video at a reception time of the command on the display unit of the image display apparatus.

23. The apparatus of claim 22, wherein the processor is further configured to capture a plurality of still images at first equal time intervals,
   wherein the display unit is further configured to sequentially display the plurality of still images in thumbnails along the timeline.

24. The apparatus of claim 23, wherein the display unit is further configured to sequentially display the plurality of still images in the thumbnails along the timeline, the plurality of still images being captured at second equal time intervals, and
   wherein the second equal time intervals are less than the first equal time intervals.

25. The apparatus of claim 24, wherein the display unit is further configured to display a menu for receiving an input command to display the plurality of still images captured every second time interval, between first and second still images displayed at the first time interval, and
   wherein controller is further configured to receive the input command through the menu.

26. The apparatus of claim 23, further comprising:
   an input unit configured to receive an input command for selecting one of the plurality of still images,
   wherein the display unit is further configured to display a menu for providing at least one of save, copy, and share functions according to the input command.

* * * * *